June 2, 1925.

J. F. FRADET ET AL 1,540,689

AUTOMOBILE BRAKE

Filed Aug. 30, 1924

J F Fradet
J. C. Alexanderson INVENTOR

BY *Victor J. Evans*

ATTORNEY

Patented June 2, 1925.

1,540,689

UNITED STATES PATENT OFFICE.

JOHN F. FRADET AND JULIUS C. ALEXANDERSON, OF MONANGO, NORTH DAKOTA; SAID FRADET ASSIGNOR TO SAID ALEXANDERSON.

AUTOMOBILE BRAKE.

Application filed August 30, 1924. Serial No. 735,176.

*To all whom it may concern:*

Be it known that we, JOHN F. FRADET and JULIUS C. ALEXANDERSON, citizens of the United States, residing at Monango, in the county of Dickey and State of North Dakota, have invented new and useful Improvements in Automobile Brakes, of which the following is a specification.

The object of this invention is to provide for special control of the brake when the hand lever of a Ford automobile is thrown for releasing the clutch.

With the foregoing and other objects in view, the invention consists in the novel construction and arrangement of elements described illustrated and claimed, it being understood that modifications may be made within the scope of the claims without departing from the spirit of the invention.

In the accompanying drawings.

Figure 1:
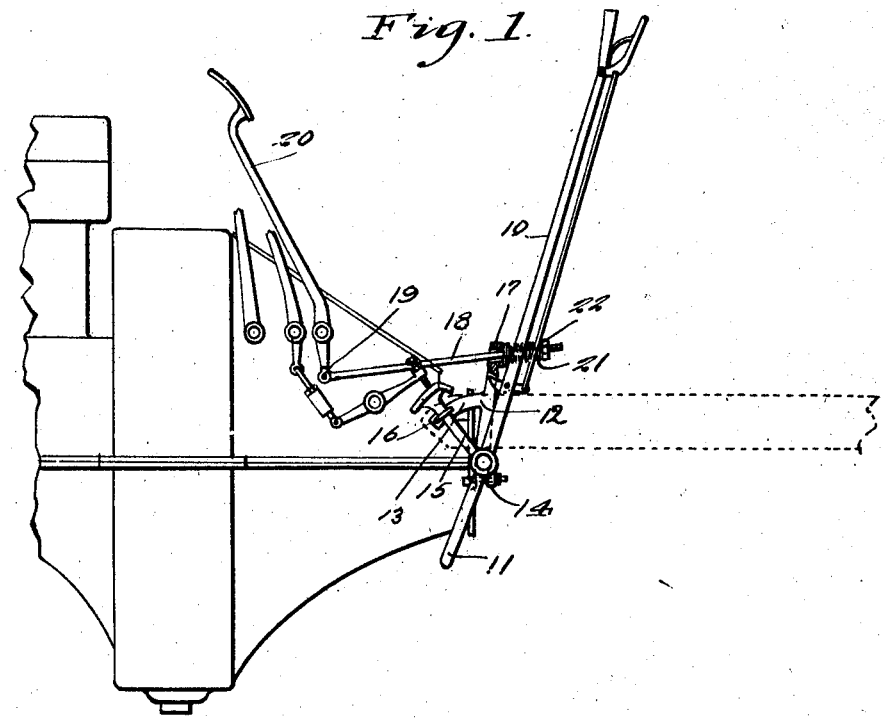
Figure 1 is a view in side elevation, showing the special construction employed and its relation to standard construction.
Figure 2:
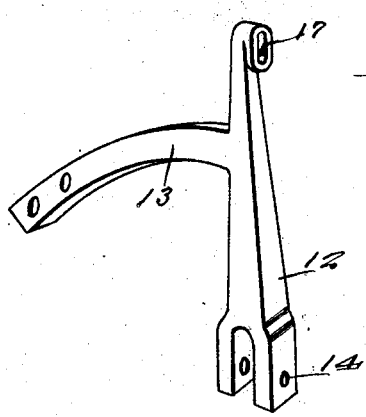
Figure 2 is a perspective view of a bracket having a special function in connection with the operation of the service brake pedal.

The usual hand lever for controlling the clutch and emergency brake of a Ford automobile is designated 10, and is connected with a control shaft 11 upon which is mounted a special bracket 12 including lateral arm 13 and forked portion 14 adapted to be clamped to shaft 11.

Arm 13 of the bracket just referred to is connected with speed lever 15 by means of a U bolt or the like 16, and the bracket includes an upper apertured portion 17 permitting the free passage therethrough of connecting rod 18 pivoted at 19 to the stem of service brake pedal 20.

A spring 21 surrounds one end of rod 18 beyond the eye at 17, and is retained and adjusted by nut 22.

When control lever 10 releases the clutch, the bracket 12 will exert a pull on rod 18 and operate pedal 20, causing the service brake to act as a positive emergency brake. Under usual running conditions, with hand lever 10 in its forward position, the bracket 12 will move forward, and will not interfere with the ordinary use of the service brake, rod 18 sliding freely through the eye at 17.

We therefore provide a special safety brake, with but little additional construction, and one which is applied without special attention on the part of the driver.

What we claim is:

1. In a device of the class described, a lever for releasing a main clutch, a control shaft on which the lever is mounted, an arm rigid with the shaft, a speed lever connected with the arm, a service brake pedal and stem therefor, a rod pivoted to the stem, said rod passing loosely through one end of the arm mounted on said shaft, and means causing the operation of the rod and pedal by the lever upon throwing the latter to clutch releasing position.

2. In a device of the class described, a lever for releasing a main clutch, a control shaft on which the lever is mounted, an arm rigid with the shaft, a speed lever connected with the arm, a service brake pedal and stem therefor, a rod pivoted to the stem, said rod passing loosely through one end of the arm mounted on the shaft, a spring encircling the rod and bearing on the arm, and an adjusting device on the rod, for retaining and adjusting the spring.

In testimony whereof we affix our signatures.

JOHN F. FRADET.
JULIUS C. ALEXANDERSON.